United States Patent Office 2,703,312
Patented Mar. 1, 1955

2,703,312

PROCESS FOR TREATING LIQUID EFFLUENTS CONTAINING PHENOLIC TYPE SUBSTANCES

Victor Adams Hann, Havertown, and Sigismund Joseph Niegowski, Philadelphia, Pa., assignors to The Welsbach Corporation, Philadelphia, Pa., a corporation of Delaware No Drawing. Application March 23, 1951, Serial No. 217,300

6 Claims. (Cl. 210—2)

This invention relates to a process for the treatment of liquid effluents containing phenolic type compounds so as to render such effluents unobjectionable, in so far as the phenolic substances are concerned, and thereby to facilitate the safe disposal thereof.

Certain liquid effluents, such as those resulting from coke oven operations, are found to contain phenolic type substances such as phenol, cresols, xylenols, and the like. Phenolic type substances are objectionable in a disposable waste because of their toxicity to animal and plant life, and particularly because of the odor and taste intensity imparted by such substances to the water into which such a waste is discharged, especially when water containing such compounds is chlorinated at water treatment plants. A specific example of this type of waste is the effluent from the ammonia stills in coke oven operations. The ammonia still effluents, even where the oven liquors are passed through a dephenolizer, contain a residual concentration of phenolic type compounds which hereinafter will sometimes be referred to as "phenols."

It has been proposed to subject these phenolic wastes to a chlorine oxidation treatment in order to remove the phenols. However, effective chlorination requires a large excess of chlorine, it being estimated that approximately 5000 to 6000 p. p. m. is required to insure oxidation of the phenols; and this would raise the chloride content of the waste considerably. Since a large excess of chlorine has to be employed, the residual chlorine has to be removed before final discharge because, when a waste having a high residual concentration of chlorine is admixed with other phenolic waste materials (which also are produced normally in coking operations) very objectionable forms of chlorinated phenols are produced. Furthermore, chlorine preferentially attacks ammonia so that, in the treatment of coke oven ammonia still wastes, more oxidant is required to oxidize the phenols than would otherwise be required. Beyond this, chlorinated phenols are compounds of very high toxicity and they introduce a taste and odor intensity of about a hundred or more times that of phenol alone. In addition, such chlorination treatments are expensive and require very close laboratory control.

Accordingly, it is an object of this invention to avoid objections of the kind just noted and to provide an economical method for the treatment of phenolic wastes, particularly coking plant wastes, so as to render them unobjectionable. It is another object to provide such a process which is simple to operate and which requires a minimum of laboratory control or other manual attention. Other objects and advantages will be apparent or will be pointed out hereinafter.

These objects and advantages are accomplished in accordance with this invention by oxidizing the phenolic type compounds contained in an effluent by passing ozone into such a liquid effluent at alkaline pH's.

The ozone treatment can be carried out in any equipment capable of being employed to effect the dispersion of gases in liquids. Preferably the ozone is introduced into the liquid through orifices placed near the bottom of a treating tank, basin, tower, or the like, and allowed to percolate to the surface. The treatment can be carried out either as a batch or continuous process.

For purposes of this invention it is possible to employ either ozone or ozone diluted with other gases such as ozonized air or ozonized oxygen and such substances can be produced by any of the well known methods.

By this invention it has been found that, in spite of the known instability of the ozone in alkaline solutions and particularly within the higher pH ranges, it is possible to remove phenols from liquid wastes with ozone even if the waste is highly alkaline and pH's over 10.5 have been found to be especially suitable. The "phenols" are thereby oxidized to unobjectionable forms and such treated wastes can be safely discharged without fear of phenolic pollution. Further it has been found that when the ozonation of the phenols is carried out in effluents on the alkaline side which contain other oxidizable impurities, the phenols will be preferentially oxidized if the initial pH is maintained at a range between about 10.5 and 12.5, with an optimum generally in the neighborhood between 11.5 and 12.5 depending upon the individual waste under treatment.

The following examples will show how this invention may be carried out; the invention, however, is not to be construed as limited thereto.

EXAMPLE I

A coke oven ammonia still waste containing 140 p. p. m. of phenols (as determined by the Gibbs method) was employed. Aliquot portions of the waste were adjusted to various pH's by adding appropriate acids or bases. Ozone, 540 p. p. m., was then passed through each of the samples and the residual phenols were ascertained by the Gibbs method. The results, in part, are tabularized below in Table I:

*Table I*
EFFECT OF pH ON OZONATION OF PHENOLS

| Initial pH | Residual Phenols (p. p. m.) |
|---|---|
| 10.0 | 125 |
| 10.5 | 80 |
| 11.0 | 85 |
| 11.5 | 27 |
| 12.0 | 11 |

At pH's of about 12 the ozone phenols oxidation appeared to be very rapid and the ozone was quantitatively absorbed by the waste. At lower pH's the phenols were oxidized but at a slower rate. Toward the end of the phenols oxidation, ozone was not absorbed as rapidly as it could be introduced into the waste.

EXAMPLE II

A dephenolized ammonia still waste containing about 37 p. p. m. phenols adjusted to various pH's by the appropriate addition of acidic and alkaline materials was treated with ozonized air and the residual phenols were determined at intervals during the treatment. The results are tabulated in part below in Table II.

*Table II*
EFFECT OF INITIAL pH ON PHENOLS DESTRUCTION

| pH 9.9 | | pH 11.0 | | pH 11.6 | | pH 11.8 | | pH 12.3 | | pH 12.8 | |
|---|---|---|---|---|---|---|---|---|---|---|---|
| Ozone, p. p. m. | Phenol, p. p. m. | Ozone, p. p. m. | Phenol, p. p. m. | Ozone, p. p. m. | Phenol, p. p. m. | Ozone, p. p. m. | Phenol, p. p. m. | Ozone, p. p. m. | Phenol, p. p. m. | Ozone, p. p. m. | Phenol, p. p. m. |
| 0 | 39 | 0 | 37 | 0 | 39 | 0 | 35 | 0 | 40 | 0 | 35 |
| 214 | 30 | 213 | 21 | 211 | 17 | 207 | 5.7 | 211 | 17 | 219 | 12 |
| 439 | 25 | 438 | 18 | 432 | 5.6 | 525 | 0.8 | 432 | 3 | 450 | 1.3 |
| 678 | 20 | 675 | 13 | 666 | 3.5 | 679 | 0.1 | 667 | 0.3 | 694 | 0.3 |

EXAMPLE III

A dephenolized coke oven ammonia still waste containing about 100 p. p. m. of phenols was treated as above in Example II; the results are tabulated in part below in Table III.

*Table III*

| pH 11.6 | | pH 11.8 | | pH 12.0 | | pH 12.2 | |
|---|---|---|---|---|---|---|---|
| Ozone, p. p. m. | Phenols, p. p. m. | Ozone, p. p. m. | Phenols, p. p. m. | Ozone, p. p. m. | Phenols, p. p. m. | Ozone, p. p. m. | Phenols, p. p. m. |
| 0 | 103 | 0 | 100 | 0 | 103 | 0 | 97 |
| 104 | 68 | 112 | 52 | 108 | 64 | 106 | 71 |
| 208 | 42 | 224 | 34 | 216 | 44 | 212 | 49 |
| 314 | 27 | 338 | 19 | 327 | 25 | 321 | 28 |
| 423 | 18 | 455 | 9 | 440 | 10 | 437 | 13 |
| 536 | 15 | 577 | 1.9 | 558 | 2.3 | 555 | 3.3 |
| 663 | 13 | 714 | 0.2 | 690 | 0.2 | 688 | 0.7 |

Since the waste effluent from ammonia stills generally has a pH of about 12, adjustment of pH is not essential in order to effectively oxidize the "phenols" to unobjectionable forms. However, in other wastes the pH of the material to be treated may be anywhere along the pH scale. In such instances the pH of the waste should be adjusted to have a pH greater than about 10.5 before ozonation. This adjustment can be carried out by the addition of suitable reagents. Obviously if the material has a pH below 10.5 adjustment is accomplished by the addition of alkaline substances such as lime, caustic soda, soda ash, ammonia, and the like. Other alkaline materials would be effective in this connection but from an economic standpoint they generally are impractical. These alkalinity adjustments can also be made with alkaline waste materials which may be formed in other operations.

From the foregoing description it will be apparent that a new and useful method for the treatment of liquid waste materials containing phenolic type substances has been presented. By use of this method phenolic pollution can be prevented by effectively removing the phenols even though they may be present in very low concentration.

Since many widely differing embodiments of the invention will occur to one skilled in the art, the invention is not limited to the specific details disclosed and various changes can be made therein without departing from the spirit and scope thereof.

We claim:
1. A process for the treatment of liquid effluents containing phenolic type compounds which comprises adjusting the alkalinity of the effluent so that it has a pH greater than about 10.5 and passing ozone into said alkaline effluent.

2. In coke oven operation, the process for the treatment of the ammonia still wastes containing phenolic type substances in order to prevent phenolic pollution which comprises adjusting the pH of said waste to about 12 and passing ozone into the thus adjusted effluent.

3. The process for the treatment of liquid coke oven ammonia still waste containing phenols which comprises adjusting and maintaining the alkalinity of the waste at a pH greater than about 10.5 and oxidizing the phenols with ozone.

4. In a process involving the ozone-oxidation of the phenols contained in a liquid effluent, the step which comprises carrying out said oxidation in a solution having a pH greater than about 10.5.

5. In a process involving the ozone-oxidation of the phenols contained in a waste effluent, the step which comprises carrying out said oxidation in a solution having a pH between about 11.5 and 12.5.

6. In a process involving the ozone-oxidation of phenols contained in a waste effluent, the steps which comprise adjusting the pH to greater than about 11.5 and carrying out said ozone-oxidation in an effluent maintained at said adjusted pH.

References Cited in the file of this patent
UNITED STATES PATENTS
1,341,913    Leggett _____ June 1, 1920